United States Patent Office 3,574,134
Patented Apr. 6, 1971

3,574,134
PROCESS FOR RAPIDLY GELLING AN
ORGANIC LIQUID
Robert J. F. Palchak, Springfield, Va., assignor to
The Susquehanna Corporation
No Drawing. Continuation of application Ser. No.
493,270, Oct. 5, 1965. This application May 31,
1968, Ser. No. 752,408
Int. Cl. B01j 13/00; C10l 7/02
U.S. Cl. 252—316         15 Claims

ABSTRACT OF THE DISCLOSURE

A process for rapidly gelling an organic liquid by cationically polymerizing polyvinyl ether monomers in said organic liquid. This process is useful for rapidly gelling the contents of railroad tank cars, highway tank trucks, storage tanks, etc., which contain liquid organic chemicals, after they have ruptured to prevent further losses and fire hazards.

---

This application is a continuation of U.S. patent application Ser. No. 493,270, filed Oct. 5, 1965, and now abandoned.

This invention relates to a process for gelling an organic liquid. More particularly, it relates to a method for rapidly gelling an organic liquid by polymerizing a polyfunctional vinyl ether monomer in the presence of said liquid and a catonic polymerization catalyst for the monomer.

The gelling of an organic liquid by introducing into the liquid a gelling agent is a well-known procedure which has been carried out in the preparation of gelled fuels, gelled incendiary agents, and other gelled liquids, or gels. Usually such fuels, agents and gels are manufactured in advance of packaging or loading into containers, thereby eliminating time as a critical factor in the formation of the gel. Also, such manufacture usually is carried out in processing equipment which can be closely controlled as to temperature and mixing. For example, the ingredients used in preparing the gel can be mixed in an agitated vessel at an elevated temperature to facilitate solution and dispersion of the gelling agent in the liquid to be gelled, and the mixture then can be cooled before or after loading.

In contrast to such methods of forming the gelled product, the process of this invention is especially useful for the gellation, in a time period often measured in seconds, of an organic liquid under substantially static conditions, i.e. with a minimum of stirring, in an isolated location at a temperature in the range of from about —65° F. to about 150° F., depending on the freezing point and boiling point of the mixture containing the organic liquid to be gelled.

The process of this invention is especially useful in applications where rapid solidificaton is needed, for example in locations where hazardous or costly liquid organic chemicals in storage tanks are corrosive and cause the tanks suddenly to begin to leak as in a tank farm. Similarly the process is useful for protection of costly or dangerous chemical liquids in railroad tankcars and in highway tank trucks in which the contents can be gelled quickly to minimize expensive losses and danger of explosion and fire in the event of derailment of the tankers or upset of the trucks. The process also can be adapted to gel fuels and other organic liquids in airborne containers such as fuel tanks and other vessels. Moreover, the process is useful to gel liquids in storage tanks on seagoing vessels to minimize sloshing.

Broadly speaking, the invention comprises mixing a gellable organic liquid with an amount of cationically polymerizable monomer, preferably a monomeric polyfunctional vinyl ether, sufficient to convert said liquid to a substantially continuous gel and rapidly polymerizing said ether in the presence of a cationic polymerization catalyst. The gel which is formed will in some cases be a continuous gel and in other cases will be a granular mass of gel particles, depending on the gellable liquid being solidified.

In practice of the invention, from about 2 to about 25 parts by weight of a cationically polymerizable monomer are added to 100 parts of the organic liquid to be gelled in a vessel. Catalyst in the form of a Lewis acid then is added to the vessel immediately before gelling is to take place. Upon contact with the Lewis acid catalyst, the monomer rapidly polymerizes to a gel structure embodying the organic liquid.

The addition of the monomer to the liquid to be gelled can be carried out in advance of the actual gel formation provided the organic liquid is one which is nonreactive with the cationically polmyerizable monomer. Some organc liquids are reactive with the monomer and themselves serve as catalysts for polymerization. With the latter organic liquids, the addition of the monomer should not be made until immediately before gelling is desired.

Addition of the monomer to the gellable organic liquid and mixing of the resulting mixture with the Lewis acid catalyst can be carried out by means known to the art. For example, when the material to be gelled is normally a liquid at ambient temperature and pressure, the monomer can be added directly to the liquid by gravity feed or by pumping means. Similarly, when the liquid is one having a vapor pressure above atmospheric, the monomer can be charged to the liquid by pumping or by use of inert gas or air pressure. The catalyst can be added in the same way in an appropriate solvent, which preferably is some of the liquid to be gelled.

The monomers used in the practice of this invention are preferably polyfunctional vinyl ether monomers. The term polyfunctional vinyl ether monomer, is used in the specification and claims, defines a cationically polymerizable monomer having from 2 to about 8 vinyloxy groups. Monomers having from 2 to about 4 vinyloxy groups are especially preferred in that they generally yield gels of superior phyiscal properties. The term "vinyloxy groups" includes —OCH=CH$_2$ groups and —O—CH=CH— moieties contained in heterocyclic rings.

Thus, the preferred monomers used in the practice of this invention are represented by the formulae:

(1) R$($OCH=CH$_2)_x$
(2) R—(vinyloxy heterocycle)$_x$
(3) (vinyloxy heterocycle)$_n$—R$($OCH=CH$_2)_y$ wherein R is a multivalent organic radical, the vinyloxy heterocycle contains at least one —OCH=CH— group in the heterocyclic ring, x is an integer from 2 to 8 and n is an integer from 1 to 7, y is an integer from 1 to 7 and the sum of n+y is from 2 to 8. The monomers represented by Formula 1 above include: polyvinyl ethers of alkyl polyols and amine or halogen substituted alkyl polyols such as, for example, divinyl ether of ethyleneglycol, divinyl ether of 1,4-butanediol, 2,2-divinyl-oxypropane, trivinyl ether of glycerol, divinyl ether of triethanolamine, and 1,2-divinyloxy-3-chloropropane; polyvinyl ethers of polyoxyalkylene polyols and amine or halogen substituted polyoxy alkylene polyols such as polyvinyl ethers of polyalkylene glycols, e.g. divinylether of pollyethylene glycol or polypropylene glycol, and tetravinyl ether of N,N,N',N, tetrakis (2-hydroxypropyl) ethylenediamine; and the polyvinyl ethers of aromatic polyols and amine or halogen substituted aromatic polyols such as, for example, divinyl ethers of catechol, resorcinol or hydroquinone, di-or trivinyl ethers of pyrogallol or phloroglycinol, 3,4-divinyloxy-chlorobenzene, and 3,4-divinyloxy-aniline.

Examples of monomers represented by Formula 2 include:
bis(2,2'-dimethylolfuryl)-1,4'-butane

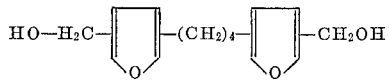

and bis(3,3'-dihydropyrano)-1-4-butane

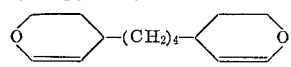

Formula 3 is representative of such monomers as α-furfuryl vinyl ethers.

It will be noted from the foregoing monomer examples that the multivalent organic radical is either a linear aliphatic moiety or an aromatic radical.

The polyfunctional vinyl ethers of the polyalkylene glycols are espectially preferred for practice of the invention.

The amount of polyfunctional vinyl ether monomer used to practice the invention preferably will be in the range from about 5 to 15%, although less or more than this amount, e.g., from about 2 to 25%, is advantageously used in some embodiments. When a solid continuous gel is to be made, more monomer is used; when a viscous, gelatinous product is to be made, less monomer is used. In general, the optimum amount of a specific monomer required to gel a particular gellable organic liquid to the desired consistency can be readily determined by routine testing. The temperature conditions during polymerization and the amount and species of catalyst used also will, of course, determine the rigidity and continuity of the gelled product made, as well as its rate of formation.

By way of precaution, an excess of monomer should not be used under conditions which would result in an uncontrollable exothermic reaction with consequent elevation of temperature and pressure in the vessel wherein the gelling is practiced. Furthermore, due consideration must be taken to provide adequate void space in a closed vessel in which the gelling is practiced in order to preclude rupture of the vessel by hydraulic pressure. Also, as is known, vinyl ethers are highly reactive in acid-catalyzed hydrolysis, alcoholysis and polymerization. Therefore, the polyfunctional vinyl ether monomer of commerce may be inhibited with traces of an inhibitor, e.g. triethylenetriamine. The presence of this inhibitor does not interfere with the practice of the invention as herein described and does not need to be removed.

The time required for substantial gelling of a particular organic liquid is a function of the variables involved, e.g., the chemical and physical characteristics of the organic liquid, the particular polyfunctional vinyl ether monomer used and its amount, the particular catalyst used and its amount, the temperature at which gelling is carried out, and whether mechanical mixing of the ingredients is used. Under ambient conditions, gelling, in many instances, can be carried out in a matter of 10 to 30 seconds. The optimum combination of variables of monomer, catalyst and amounts of each required to achieve a desired rate and degree of gelling at a specific temperature condition for the particular organic liquid to be gelled can be determined routinely to achieve the optimum gelling rate and degree of gel formation.

The polyfunctional vinyl groups present in the vinyl ether monomers taught to be used herein provide a superior means for achieving the gelling in a minimum period of time, particularly because crosslinking occurs in the polymer molecule as it forms and grows. Although the advantage of the invention is especially attained in those cases where substantially instantaneous gelling is desired, the invention is also useful for slower gellations where periods of time of from 30 seconds to as much as 30 minutes or longer can be tolerated.

Although the polyfunctional vinyl ether monomers are preferred for reasons previously mentioned, other monomers which are known to undergo cationic polymerization, for example epoxides, polyvinyl sulfides, and imines can be used in the practice of this invention.

The Lewis acid used in practice of the invention can be any one of the compounds, or a mixture thereof, covered by the well-known definition of such an acid. Preferred Lewis acids include stannic chloride, aluminum chloride, boron trifluoride, boron trifluoride-etherate, iodine, zinc chloride, ferric chloride, silicon tetrachlorde phosphoric acid, sulfur dioxide, acid-washed alumina, acidic molecular sieves, acid silicates, and sulfuric acid. Stannic chloride is especially preferred in view of its high reactivity and the polymer stabilzing effect of organic tin compounds which may form through reaction of part of the stannic chloride with reactive vinyl groups during the polymerization of polyfunctional vinyl ether monomers.

The specific amount of a particular Lewis acid required to catalyze the polymerization of the particular monomer used to practice the invention can, of course, be determined by routine tests. Usually from about 0.5% to about 10% by weight based on the weight of monomer used will be sufficient at room temperature; at a lower temperature more may be required, e.g. about 15%, and at a higher temperature, less will be required.

The term gellable organic liquid as used herein means any organic liquid which can be changed from its normally liquid form to a substantially non-liquid form by the practice of the invention. Such liquids generally include any which are not so basic as to interfere with the cationic polymerization of the monomer by destroying the Lewis acid catalyst. Thus the invention can be utilized to gel a wide variety of compounds, including: saturated and unsaturated hydrocarbons, halogenated hydrocarbons, alcohols, ethers, aldehydes, ketones, carboxylic acids, acid halides, acid amides, esters, aliphatic nitrogen and sulfur compounds, aromatic hydrocarbons, aromatic halogen compounds and amines, aromatic nitro compounds, sulfonic acids, aromatic alcohols, phenols, aldehydes, ketones, quinones and acids.

The invention can be practiced, for example, with liquid oxygenated hydrocarbons, of which examples are di-lower alkyl-phthalates, e.g. dimethyl phthalate, dibutyl phthalate, dioctyl phthalate and dimethyl nitrophthalate; tri-lower alkyl citrates, e.g. triethyl citrate, tributyl citrate, and triamyl citrate; acyl tri-loyer alkyl citrates, e.g., acetyl triethyl citrate and acetyl tributyl citrate; glycerol-lower alkanoates, e.g. monacetin, triacetin, glycerol tripropionate and glycerol tributyrate; lower alkylene-glycol lower alkanoates, e.g. ethylene glycol diacetate, triethylene glycol dihexanoate, the hydroxyethyl acetate; lower alkylene-glycols, e.g. diethylene glycol, polyethylene glycol and tetrapropylene glycol; lower alkylene-glycol oxalates, e.g. diethylene glycol oxalate and polyethylene glycol oxalate; lower alkylene maleates, e.g. ethylene glycol maleate; lower alkylene-glycol diglycolates, e.g. ethylene glycol diglycolate and diethylene glycol diglycolate. The invention can be practiced, for further example, with liquid organophosphorus compounds, particularly the phosphites, of which examples are trialkyl phosphite, e.g. triethyl phosphite, tripropyl phosphite, triisopropyl phosphite and tributyl phosphite; dialkyl hydrogen phosphites, e.g. dimethyl hydrogen phosphite, diethyl hydrogen phosphite, dipropyl hydrogen phosphite, and ethyl hexyl hydrogen phosphite; monoalkyl phosphites, e.g. methyl phosphite, ethyl phosphite and propyl phosphite. The invention also can be practiced with liquid hydrocarbons such as hexane, heptane, octane, nonane, decane, undecane, dodecane, benzene, toluene and the like. Mixtures of the aforementioned liquids including such well-known petroleum fractions as gasoline and kerosene can also be gelled by the process of this invention. While both saturated and unsaturated liquids can be gelled, the gelling of unsaturated liquids has been observed to proceed at a slower rate.

The invention is further disclosed in the following examples in which the parts shown are by weight unless otherwise stated.

EXAMPLE 1

12 parts of divinyl ether of diethylene glycol were poured into 100 parts of dibutyl phthalate at room temperature in an open container. 1.2 parts of stannic chloride dissolved in dibutyl phthalate were then poured into the mixture in the container. Within 10 seconds the liquids in the container were transformed into a continuous mass of gel which was rigid enough so that pieces could be cut and lifted away with a spatula.

EXAMPLE 2

8 parts of divinyl ether of diethylene glycol were poured into 100 parts of dibutyl phthalate held in a container at about 150° F. About 0.8 part of stannic chloride dissolved in dibutyl phthalate was then added to the mixture. A firm continuous gel formed in about 3 seconds.

EXAMPLE 3

12 parts of divinyl ether of diethylene glycol were mixed into 100 parts of dibutyl phthalate in a vessel at about minus (−) 65° F. 1.2 parts of stannic chloride dissolved in dibutyl phthalate were then stirred into the mixture. A viscous gel formed in about 10 minutes. The temperature of the gelled mass then was gradually raised to room temperature whereupon the gel became about as rigid as the gel in Example 1.

EXAMPLE 4

10 parts of divinyl ether of diethylene glycol were added to 100 parts of ethyl hexyl hydrogen phosphite in a vessel at room temperature. 1 part of stannic chloride dissolved in the phosphite was then added to the mixture. A firm gel formed in the vessel in about 12 seconds.

EXAMPLE 5

The gel forming procedure of Example 4 was carried out at about 150° F. A firm gel was formed in about 7 seconds.

EXAMPLE 6

The procedure of Example 4 was carried out at about (−) 65° F. A viscous gel was formed in about 10 minutes.

EXAMPLE 7

10 parts of divinyl ether of diethylene glycol were added to 100 parts of hexane in a vessel at room temperature. 1 part of boron trifluoride-etherate was added to the mixture. A firm granular gel formed in the vessel in about 10 seconds.

While the present invention has been described with respect to specific examples, it is to be understood that these examples are for purposes of illustration and that the invention is not limited thereto, since many variations and modifications can be practiced without departing from its spirit and scope.

I claim:

1. A process for rapidly gelling an organic liquid, which comprises mixing a gellable organic liquid with an amount of cationically polymerizable polyvinyl ether monomer sufficient to convert said liquid to a gel when polymerized therein, said amount being about 2 to about 25 parts per 100 parts of liquid, said monomer being selected from the groups consisting of polyvinyl ethers represented by the formulae:

(1) $R(OCH=CH_2)_x$
(2) $R$—(vinyloxy heterocycle)$_x$
(3) (vinyloxy heterocycle)$_n$—$R(OCH=CH_2)_y$ wherein R is a multivalent linear aliphatic radical or a multivalent aromatic radical, the vinyloxy heterocycle contains at least one —OCH=CH— group in the heterocyclic ring, $x$ is an integer from 2 to 8, $n$ and $y$ are integers from 1 to 7, and the sum of $n$ plus $y$ is from 2 to 8, contacting said monomer with a cationic polymerization catalyst and polymerizing said monomer thereby gelling said liquid within a period of up to about 30 minutes.

2. The process according to claim 1 wherein $x$ is an integer from 2 to 4 and $y$ is an integer from 1 to 3, and $n$ is 1.

3. The process according to claim 1 wherein said polyfunctional vinyl ether monomer is selected from the group consisting of polyvinyl ethers of: alkyl polyols; amine substituted alkyl polyols; halogen substituted alkyl polyols; polyoxyalkylene polyols; amine substituted polyoxyalkylene polyoys; halogen substituted polyoxyalkylene polyols; aromatic polyols; amine substituted aromatic polyols; and halogen substituted aromatic polyols.

4. The process according to claim 1 in which said cationic polymerization catalyst is a Lewis acid selected from the group consisting of stannic chloride, aluminum chloride, boron trifluoride, boron trifluoride-etherate, iodine, zinc chloride, ferric chloride, silicon tetrachloride, phosphoric acid, sulfur dioxide, acid-washed alumina, acidic molecular sieves, acid silicates, and sulfuric acid.

5. The process according to claim 1 wherein said cationic polymerization catalyst is stannic chloride.

6. The process according to claim 1 wherein said cationic polymerization catalyst is boron trifluoride.

7. The process according to claim 1 wherein said cationic polymerization catalyst is boron trifluoride etherate.

8. The process according to claim 1 wherein the monomer is a divinyl ether of an alkylene glycol.

9. The process according to claim 1 wherein the monomer is divinyl ether of diethylene glycol.

10. The process of claim 1 in which said monomer comprises about 5 to about 15 parts per 100 parts of said liquid and said liquid gels within a period of up to about 10 minutes.

11. The process of claim 2 in which said monomer comprises about 5 to about 15 parts per 100 parts of said liquid and said liquid gels within a period of up to about 10 minutes.

12. The process of claim 3 in which said monomer comprises about 5 to about 15 parts per 100 parts of said liquid and said liquid gels within a period of up to about 10 minutes.

13. The process of claim 4 in which said monomer comprises about 5 to about 15 parts per 100 parts of said liquid and said liquid gels within a period of up to about 10 minutes.

14. The process of claim 8 in which said monomer comprises about 5 to about 15 parts per 100 parts of said liquid and said liquid gels within a period of up to about 10 minutes.

15. The process of claim 9 in which said monomer comprises about 5 to about 15 parts per 100 parts of said liquid and said liquid gels within a period of up to about 10 minutes.

References Cited

UNITED STATES PATENTS

| | | | |
|---|---|---|---|
| 2,477,225 | 7/1949 | Zoss | 260—91.1 |
| 2,585,035 | 2/1952 | Roach et al. | |
| 2,633,460 | 3/1953 | Neher et al. | 260—91.1 |
| 3,458,483 | 7/1969 | Dubsky et al. | 260—91.1X |

RICHARD D. LOVERING, Primary Examiner

U.S. Cl. X.R.

44—7; 260—88.3, 88.5, 91.1